UNITED STATES PATENT OFFICE 2,511,063

CONDENSATION PRODUCT OF FORMALDE-HYDE, A PHENOL, AND A KETONE-AMINE CONDENSATE

Joseph R. Ingram, Nitro, W. Va., assignor to Monsanto Chemical Company, St. Louis, Mo., a corporation of Delaware No Drawing. Application June 12, 1946,
Serial No. 676,349

16 Claims. (Cl. 260—45)

The present invention relates to derivatives of the condensation products of aromatic amines and ketones. More particularly, this invention relates to phenol-formaldehyde derivatives of the products obtained by condensing aromatic amines with aliphatic ketones.

In accordance with the present invention, it has been discovered that condensation products of aromatic amines and aliphatic ketones react nearly quantitatively with a phenol and formaldehyde to produce resinous products having valuable properties.

The condensation products from which the new derivatives are obtained may be prepared in known manner by condensing an aromatic amine with an aliphatic ketone in the presence of a catalyst, as for example iodine, benzene sulfonic acid, or sulfuric acid. While the acetone condensation products are the best known, condensation products of other aliphatic ketones, as for example methyl ethyl ketone and the aliphatic ketones containing less than ten carbon atoms and not more than two oxygen atoms described by Semon and Sloan in U. S. Patent 2,000,039, have been described and are suitable for use in the present invention. These condensation products are generally conceded to comprise chiefly dihydroquinoline bodies or dihydroacridine bodies but the present invention is in nowise concerned with the correctness of these views. The condensation products, whether derived from secondary or primary amines, react nearly quantitatively with a phenol and formaldehyde. Phenol itself, beta naphthol, and chloro phenol are typical examples of suitable phenols. Directions for condensing aromatic amines with acetone are furnished in various publications, typical of which are U. S. Patent 2,062,885 to Ingram, U. S. Patent 2,000,039 to Semon and Sloan, and U. S. Patent 1,807,355 to Ter Horst. Furthermore, the rearranged product obtained by heating the aniline-acetone condensation product with a strong non oxidizing mineral acid as described in U. S. Patent 2,004,752 to Ingram undergoes reaction with a phenol and formaldehyde.

Preparation of the phenol-formaldehyde derivatives of the condensation products may be conducted in a single step or in separate stages by preliminary mixing of any two of the reactants and finally condensing with the third. However, the most satisfactory results have been obtained by first admixing the phenol with the amine and gradually adding the formaldehyde to the mixture.

The reactions apparently involve the combination of one mol each of the phenol, formaldehyde and acetone-aromatic amine condensation product assuming the latter to be a dihydroquinoline or a dihydroacridine. Accordingly, the reactants may be brought together in theoretical or equimolecular proportions although it is generally preferable to employ a molar proportion of formaldehyde somewhat in excess of the other reactants. Some control over the physical properties of the final products may be exercised by control of the proportion of formaldehyde. Thus, the hardness of the product may be increased by increasing the proportion of formaldehyde. For instance, treatment of one molecular proportion of the condensation product of aniline and acetone with one molecular proportion each of phenol and formaldehyde gave a product which melted at 85° C. whereas increasing the proportion of formaldehyde to 2.5 molecular proportions gave a product melting around 100° C.

The reactions take place in excellent yield even in the absence of condensation catalysts or possibly in the presence of the merest traces of acidic condensing agents. Substantial amounts of acid condensing agent result in the formation of infusible insoluble hard products. Consequently, it is desirable to remove or neutralize any acid condensing agents remaining in the aromatic amine-acetone condensation products.

The following specific embodiments illustrate the invention in detail and are to be taken as illustrative and not limitative of the invention. The formaldehyde employed in the reactions was the usual commercial product consisting of an aqueous solution of 40% formaldehyde by volume or 37% by weight.

*Example I*

The condensation product of p-amino diphenyl and acetone, a commercial rubber antioxidant described by Ingram, U. S. 2,062,885, and considered to consist principally of 6-phenyl 2,2,4-trimethyl-1,2-dihydroquinoline, was condensed with phenol and formaldehyde as described below. Substantially 74.7 parts by weight (0.3 mol) of the p-amino diphenyl-acetone condensation product and 28.2 parts by weight (0.3 mol) of phenol were heated together until a homogeneous liquid product was produced. To the mixture so prepared approximately 44 parts by weight of 40% formaldehyde was gradually added with cooling. After the addition of the formaldehyde, the charge was heated gently and stirred for 4½ hours. While still warm and soft the contents of the reactor were poured out, allowed to cool, then pulverized and washed thoroughly with water. After drying, there was obtained 108 parts by weight of a brown brittle resin readily soluble in benzene which had a melting point of 80-92° C.

Example II

Into a suitable reactor there was charged 49.8 parts by weight (substantially 0.2 mol) of the condensation product of o-amino diphenyl and acetone described by Ingram, U. S. 2,062,885 and considered to consist principally of 8-phenyl-2,2,4-trimethyl-1,2-dihydroquinoline and 18.8 parts by weight (substantially 0.2 mol) of phenol. The mixture was heated to 70° C. to obtain a homogeneous composition and to it there was added approximately 30 parts by weight of 40% formaldehyde. The formaldehyde was added slowly in small portions since the reaction was strongly exothermic. The temperature rose to 83° during the addition and was kept at 85-90° for six hours after the addition of the formaldehyde.

After working up the product as described in Example I, there was obtained 75.5 parts by weight of a resinous product.

Example III

The condensation product of aniline and acetone, a commercial rubber antioxidant and considered to consist principally of 2,2,4-trimethyl 1,2-dihydro quinoline was reacted with phenol and formaldehyde in the following manner: Into a reactor of suitable capacity there was charged 190.3 parts by weight of the aniline-acetone condensation product (substantially 1.1 molecular proportions) and 103.4 parts by weight of phenol (substantially 1.1 molecular proportions). To the mixture, 147 parts by weight of 40% formaldehyde was added gradually. The temperature rose to 70° C. during the addition and was prevented from rising higher by suitable cooling. After the addition of the formaldehyde, the charge was heated at 80-90° C. for three hours. About 1000 parts by weight of water was added to the viscous mass and the mixture stirred for a short time after which the solids were filtered off and air dried. There was obtained 298 parts by weight of a resin-like product which melted at 95° C.

Example IV

The condensation product of diphenylamine and acetone, a commercial rubber antioxidant described by Ter Horst in U. S. Patent 1,807,355, was stripped of the more volatile fraction by heating up to 147° C. vapor temperature under 3 mm. pressure (bath temperature 240° C.) and the residue reacted with phenol and formaldehyde as follows: 41.8 parts by weight (substantially 0.2 mol) of the residue believed to consist principally of dimethyl dihydroacridine (M. W. 209) was mixed with 18.8 parts by weight (substantially 0.2 mol) of phenol and about 55 parts by weight of ethyl alcohol and the mixture heated to 80° C. Substantially 15.0 parts by weight of 40% formaldehyde was added gradually and the charge stirred 5 hours at 80-85° C. The alcohol was removed by distillation under reduced pressure. The residue was a dark resin, M. P. 95-99° C.

Example V

The product obtained by heating the condensation product of aniline and acetone which comprised 2,2,4-trimethyl-dihydroquinoline, with concentrated hydrochloric acid was carefully freed of acid and admixed with phenol. Thus, substantially 43.3 parts by weight of the acid rearranged aniline-acetone condensation product and 23.5 parts by weight of phenol were charged into a suitable reactor and heated to 70° C. There was then added in small portions 37.5 parts by weight of 40% formaldehyde. The reaction mixture was heated at 80-85° C. for two hours after the addition of the formaldehyde. The brittle reaction mass was then pulverized, washed with water and dried. 68 parts by weight of a resinous product melting at 115-129° C. was obtained.

The products of this invention make valuable plasticizers and fillers for resins and rubber, whether natural or synthetic. In addition, the new products possess antioxidant properties and may be used for the preservation of various organic substances which deteriorate upon exposure to air or oxygen, as for example mineral oils, vegetable oils, soap, gasoline, and rubber. While the condensation products of aromatic amines and acetone tend to discolor substances in which they are incorporated, the derivatives of this invention possess this disadvantage to a much lesser degree.

An especially important property of the products of this invention is their ability to prevent cross linking or continued polymerization of synthetic elastomers. While this phenomenon may be related to antioxidant activity, it is generally agreed that the effect is not confined to prevention of oxidation. For example, after the polymerization of butadiene and styrene in the manufacture of GR-S, it is necessary to add a substance to prevent continued hardening and embrittlement of the copolymer. Heat and oxygen greatly accelerate this hardening. The products of this invention are admirably suited for preventing continued hardening as illustrated by the soft smooth appearance of the copolymer obtained after heating in the presence of the new products.

GR-S latex type 1 containing no antioxidant was charged into a suitable container in amount equivalent to 100 parts by weight of the dry copolymer. 2.0 parts by weight of the antioxidant material was dissolved in benzene or other solvent and emulsified in water by the aid of a suitable dispersing agent, as for example dodecyl benzene sodium sulfonate. The emulsion was then added to the latex and blended thoroughly after which the copolymer was coagulated. The coagulum was washed free of salt and soap and then dried 30 minutes at 80° C. Slabs of the products so prepared were placed on glass plates and exposed to circulating air for six days at 100° C. after which the condition of the samples was examined to determine what alteration had taken place. The results are tabulated below:

| Product Added to the Copolymer | Condition of Sample After Aging |
|---|---|
| None | Hard, brittle, rough surface. |
| p-Amino diphenyl-acetone condensed with phenol and formaldehyde. | Smooth surface, soft and rubbery, homogeneous throughout. |
| o-Amino diphenyl-acetone condensed with phenol and formaldehyde. | Do. |
| Aniline-acetone condensed with phenol and formaldehyde. | Do. |
| Diphenylamine-acetone condensed with phenol and formaldehyde. | Do. |
| Mineral acid rearranged aniline-acetone condensed with phenol and formaldehyde. | Do. |

The advantage of the new additives is also shown after compounding and curing stocks of the butadiene-styrene copolymer. Thus, after coagulation of the GR-S latex to which an emulsion of one of the new antioxidants had been added and washing and drying the coagulum, vulcanizable stocks were compounded and cured in the usual manner and the vulcanizates artificially aged.

Stocks were compounded comprising,

|  | Parts by Weight | |
|---|---|---|
| GR-S latex solids containing antioxidant [1] | 100.0 |  |
| GR-S latex solids without antioxidant |  | 100.0 |
| Carbon black | 40.0 | 40.0 |
| Sulfur | 2.0 | 2.0 |
| N-Cyclohexyl 2-benzothiazyl sulfenamide | 1.2 | 1.2 |
| Zinc oxide | 3.0 | 3.0 |
| Hydrocarbon softener | 8.0 | 8.0 |

[1] Aniline-acetone condensed with phenol and formaldehyde.

The stocks so compounded were cured by heating 60 minutes in a press in the usual manner at 142° C. and the cured products artificially aged by heating for 24 hours in circulating air at 100° C. The stress-strain properties of the aged products are set forth below.

| Antioxidant | Modulus of Elasticity in lbs./in.$^2$ at 300% elongation | Tensile at Break in lbs./in.$^2$ | Ult. Elong., Per cent |
|---|---|---|---|
| Aniline-acetone condensed with phenol and formaldehyde | 1,450 | 2,310 | 430 |
| None | 1,780 | 2,060 | 320 |

The lower modulus, higher tensile and elongation of the stock prepared from the copolymer containing the antioxidant shows that the additive has inhibited cross linking and oxidation, thereby maintaining the rubbery properties to a greater degree.

As illustrative of the usefulness of the new products for inhibiting the deterioration of natural rubber, stocks were compounded comprising

|  | Parts by Weight | |
|---|---|---|
| Smoked sheet rubber | 100 | 100 |
| Carbon black | 50 | 50 |
| Zinc oxide | 5 | 5 |
| Pine tar | 2 | 2 |
| Stearic acid | 3 | 3 |
| Sulfur | 3 | 3 |
| Mercaptobenzothiazole | 0.75 | 0.75 |
| Aniline-acetone condensed with phenol and formaldehyde | 1.0 |  |

The stocks so compounded were vulcanized by heating for 60 minutes in a press in the usual manner at 135° C. and the cured products artificially aged by heating for six hours in a bomb at 121° C. and under an air pressure of 80 pounds per square inch. The stress-strain properties of the aged rubber products together with the percentage of the original tensile retained are set forth below.

| Antioxidant | Modulus of Elasticity in lbs./in.$^2$ at 300% Elongation | Tensile at Break in lbs./in.$^2$ | Ult. Elong., Per Cent | Per Cent Original Tensile Retained |
|---|---|---|---|---|
| Aniline-acetone condensed with phenol and formaldehyde | 1,610 | 2,535 | 460 | 67 |
| None | 1,310 | 1,975 | 480 | 54 |

The antioxidants of this invention may be employed in conjunction with other compositions than those specifically mentioned for the products of this invention are applicable generally to pure rubber or rubber compositions of the most varied nature. A rubber may be defined as a vulcanizable plastic material which possesses high extensibility under load coupled with the property of forcibly retracting to approximately its original size and shape after the load is removed. Examples of such products are India rubber, reclaimed rubber, balata, gutta percha, and other natural or synthetically prepared vulcanizable products which deteriorate upon aging or exposure to the atmosphere by absorption of oxygen, whether or not admixed with fillers, pigments, or accelerating agents.

As will be readily appreciated by those skilled in organic chemistry, numerous modifications of the procedures hereinbefore described can be made without departing from the spirit or scope of the present invention. Derivatives of the condensation products of acetone and other aromatic amines than those specifically mentioned may be prepared. The present invention is limited solely by the claims attached hereto as part of the present specification.

What is claimed is:

1. The resinous condensation product of at least one molecular proportion of formaldehyde and substantially one molecular proportion of phenol and substantially one molecular proportion of the essentially acid free condensation product of acetone and a primary aromatic amine possessing only amino and hydrocarbon groups and consisting solely of the elements carbon, nitrogen, and hydrogen, the molecular proportion of the acetone-amine condensation product being based on the assumption that it is a trimethyl dihydroquinoline.

2. The resinous condensation product of at least one molecular proportion of formaldehyde and substantially one molecular proportion of phenol and substantially one molecular proportion of the essentially acid free condensation product of acetone and aniline, the molecular proportion of the acetone-amine condensation product being based on the assumption that it is trimethyl dihydroquinoline.

3. The resinous condensation product of formaldehyde, phenol, and the essentially acid free condensation product of acetone and a primary aromatic amine possessing only amino and hydrocarbon groups and consisting solely of the elements carbon, nitrogen, and hydrogen, wherein the molecullar proportions of formaldehyde, phenol, and the acetone-amine condensation product are substantially equal, the molecular proportion of the acetone-amine condensation product being based on the assumption that it is a trimethyl dihydroquinoline.

4. The resinous condensation product of formaldehyde, phenol, and the essentially acid free condensation product of acetone and aniline, wherein the molecular proportions of formaldehyde, phenol, and the acetone-amine condensation product are substantially equal, the molecular proportion of the acetone-amine condensation product being based on the assumption that it is trimethyl dihydroquinoline.

5. The resinous condensation product of formaldehyde, phenol, and the essentially acid free condensation product of acetone and an amino biphenyl possessing only amino and hydrocarbon groups and consisting solely of the elements carbon, nitrogen, and hydrogen, wherein the molecular proportions of formaldehyde, phenol, and the acetone-amine condensation product are substantially equal, the molecular proportion of the acetone-amine condensation product being based on the assumption that it is a phenyl substituted trimethyl dihydroquinoline.

6. The resinous condensation product of formaldehyde, phenol, and the essentially acid free condensation product of acetone and p-amino biphenyl, wherein the molecular proportions of formaldehyde, phenol, and the acetone-amine condensation product are substantially equal, the molecular proportion of the acetone-amine condensation product being based on the assumption that it is phenyl substituted trimethyl dihydroquinoline.

7. The method of preparing a resinous condensation product which comprises heating 1 to 2.5 molecular proportions of formaldehyde and substantially 1 molecular proportion of phenol and substantially 1 molecular proportion of the essentially acid free condensation product of acetone and a primary aromatic amine possessing only amino and hydrocarbon groups and consisting solely of the elements carbon, nitrogen, and hydrogen, the molecular proportion of the acetone-amine condensation product being based on the assumption that it is a trimethyl dihydroquinoline.

8. The method of preparing a resinous condensation product which comprises heating 1 to 2.5 molecular proportions of formaldehyde and substantially 1 molecular proportion of phenol and substantially 1 molecular proportion of the essentially acid free condensation product of acetone and aniline, the molecular proportion of the acetone-amine condensation product being based on the assumption that it is trimethyl dihydroquinoline.

9. The method of preparing a resinous condensation product which comprises heating formaldehyde, phenol, and the essentially acid free condensation product of acetone and a primary aromatic amine possessing only amino and hydrocarbon groups consisting solely of the elements carbon, nitrogen, and hydrogen, wherein the molecular proportions of formaldehyde, phenol, and the acetone-amine condensation product are substantially equal, the molecular proportion of the acetone-amine condensation product being based on the assumption that it is a trimethyl dihydroquinoline.

10. The method of preparing a resinous condensation product which comprises heating formaldehyde, phenol, and the essentially acid free condensation product of acetone and aniline, wherein the molecular proportions of formaldehyde, phenol, and the acetone-amine condensation product are substantially equal, the molecular proportion of the acetone-amine condensation product being based on the assumption that it is trimethyl dihydroquinoline.

11. The method of preparing a resinous condensation product which comprises heating formaldehyde, phenol, and the essentially acid free condensation product of acetone and an amino biphenyl possessing only amino and hydrocarbon groups and consisting solely of the elements carbon, nitrogen, and hydrogen, wherein the molecular proportions of formaldehyde, phenol, and the acetone-amine condensation product are substantially equal, the molecular proportion of the acetone-amine condensation product being based on the assumption that it is a phenyl substituted trimethyl dihydroquinoline.

12. The method of preparing a resinous condensation product which comprises heating formaldehyde, phenol, and the essentially acid free condensation product of acetone and p-amino biphenyl, wherein the molecular proportions of formaldehyde, phenol, and the acetone-amine condensation product are substantially equal, the molecular proportion of the acetone-amine condensation product being based on the assumption that it is phenyl substituted trimethyl dihydroquinoline.

13. The resinous condensation product of at least one molecular proportion of formaldehyde and substantially one molecular proportion of a mono hydroxy aromatic compound reactive therewith consisting of hydrogen atoms, an oxygen atom, at least 6 but not more than 10 carbon atoms and containing not more than one chlorine atom, said hydroxy substituent and chlorine atom being linked to the aryl nucleus, and substantially one molecular proportion of the essentially acid free condensation product of an aromatic amine possessing only amino and hydrocarbon groups and consisting solely of the elements carbon, nitrogen, and hydrogen, and containing at least one hydrogen atom linked to a nitrogen, and an aliphatic ketone containing less than ten carbon atoms and not more than two oxygen atoms and consisting solely of the elements carbon, oxygen, and hydrogen, the molecular proportion of the ketone-amine condensation product being based upon the assumption that one molecular proportion of aromatic amine yields one molecular proportion of aliphatic ketone condensate.

14. The resinous condensation product of at least one molecular proportion of formaldehyde and substantially one molecular proportion of phenol and substantially one molecular proportion of the essentially acid free condensation product of acetone and a secondary aromatic amine possessing only amino and aromatic hydrocarbon groups and consisting solely of the elements carbon, nitrogen, and hydrogen, the molecular proportion of the acetone-amine condensation product being based on the assumption that it is a dihydroacridine.

15. The method of preparing a resinous condensation product which comprises heating 1 to 2.5 molecular proportions of formaldehyde and substantially 1 molecular proportion of a mono hydroxy aromatic compound reactive therewith consisting of hydrogen atoms, an oxygen atom, at least 6 but not more than 10 carbon atoms and containing not more than one chlorine atom, said hydroxy substituent and chlorine atom being linked to the aryl nucleus, and substantially 1 molecular proportion of the essentially acid free condensation product of an aromatic amine possessing only amino and hydrocarbon groups and consisting solely of the elements carbon, nitrogen, and hydrogen, and containing at least one hydrogen atom linked to a nitrogen and an aliphatic ketone containing less than ten carbon atoms and not more than two oxygen atoms and consisting solely of the elements carbon, oxygen, and hydrogen, the molecular proportion of the ketone-amine condensation product being based on the assumption that one molecular proportion of aromatic amine yields one molecular proportion of aliphatic ketone condensate.

16. The method of preparing a resinous condensation product which comprises heating 1 to 2.5 molecular proportions of formaldehyde and substantially 1 molecular proportion of phenol and substantially 1 molecular proportion of the essentially acid free condensation product of acetone and a secondary aromatic amine possessing only amino and aromatic hydrocarbon groups and consisting solely of the elements carbon, nitrogen, and hydrogen, the molecular proportion of the acetone-amine condensation product being based on the assumption that it is a dihydroacridine.

JOSEPH R. INGRAM.

REFERENCES CITED

The following references are of record in the file of this patent:

UNITED STATES PATENTS

| Number | Name | Date |
|---|---|---|
| 1,906,942 | Ter Horst | May 2, 1933 |

FOREIGN PATENTS

| Number | Country | Date |
|---|---|---|
| 359,773 | Great Britain | Oct. 29, 1931 |